United States Patent
Ho et al.

(10) Patent No.: US 11,901,762 B2
(45) Date of Patent: Feb. 13, 2024

(54) ENERGY STORAGE SYSTEM

(71) Applicant: WAYS TECHNICAL CORP., LTD., Taoyuan (TW)

(72) Inventors: Wen-Hsien Ho, Taoyuan (TW); Shao-Wei Chieh, Taoyuan (TW)

(73) Assignee: WAYS TECHNICAL CORP., LTD., Taoyuan (TW)

( * ) Notice: Subject to any disclaimer, the term of this patent is extended or adjusted under 35 U.S.C. 154(b) by 192 days.

(21) Appl. No.: 17/585,175

(22) Filed: Jan. 26, 2022

(65) Prior Publication Data

US 2022/0149648 A1 May 12, 2022

Related U.S. Application Data

(63) Continuation-in-part of application No. 16/832,544, filed on Mar. 27, 2020, now Pat. No. 11,381,098.

(30) Foreign Application Priority Data

Dec. 31, 2019 (TW) .................................. 108148553

(51) Int. Cl.
*H02J 7/34* (2006.01)
*H02J 7/00* (2006.01)

(52) U.S. Cl.
CPC .......... *H02J 7/345* (2013.01); *H02J 7/00716* (2020.01); *H02J 2207/20* (2020.01)

(58) Field of Classification Search
CPC .... H02J 7/345; H02J 7/00716; H02J 2207/50; H02J 2207/20; H02M 3/18
See application file for complete search history.

(56) References Cited

U.S. PATENT DOCUMENTS

| 8,860,359 B2* | 10/2014 | Cao .................. B60L 58/22 320/167 |
| 2012/0038214 A1 | 2/2012 | King |
| 2016/0318418 A1 | 11/2016 | Tokushige |

FOREIGN PATENT DOCUMENTS

| TW | 529230 B | 4/2003 |
| TW | 533667 B | 5/2003 |

(Continued)

OTHER PUBLICATIONS

1st Search Report for Corresponding TW Appln. 108148553 dated Nov. 25, 2021.

*Primary Examiner* — Carlos Amaya
(74) *Attorney, Agent, or Firm* — Muncy, Geissler, Olds & Lowe, P.C.

(57) ABSTRACT

An energy storage system has a battery device, a first terminal, a second terminal, a capacitor device and a DC/DC converter. The first and second terminals are respectively connected two electrodes of the battery device, and the two electrodes have opposite polarities. The capacitor device is electrically connected to the first and second terminals in parallel. The DC/DC converter is electrically connected between the first terminal and the capacitor device. The battery device composed of at least one secondary battery and the capacitor device composed of at least one capacitor are electrically connected to each other in parallel, and by combining with the DC/DC converter, configuring the relation between the equivalent series resistor of the capacitor device and the internal resistor of the battery device, and/or configuring the upper current limit of the rated current of range the DC/DC converter, the battery cycle life is increased.

10 Claims, 15 Drawing Sheets

(56) References Cited

FOREIGN PATENT DOCUMENTS

WO      WO-01/89058 A1    11/2001
WO      WO200189058 A1    11/2001

\* cited by examiner

ENERGY STORAGE SYSTEM

CROSS REFERENCE

The present invention is Continuation Application of U.S. patent application Ser. No. 16/832,544 filed on Mar. 27, 2020, and claims priority of TW Patent Application 108148553 filed on Dec. 31, 2019, wherein all contents of the references which priorities are claimed by the present invention are included in the present invention, herein.

TECHNICAL FIELD

The present disclosure relates to an energy storage system, in particular to, an energy storage system formed by combining a battery device and a capacitor device.

RELATED ART

Handheld devices (such as notebooks, pads and phones), electric motors and electric cars become more popular, and all of them have batteries therein. A PCT publication, WO01/89058A1, discloses that a capacitor having a very low resistance of an equivalent series resistor is disposed between a load and a battery in a circuit, and the resistance of the equivalent series resistor must be less than a half resistance of an internal resistor of the battery. It can be used to reduce consumption of a transient current and a voltage drop generated on the battery. By reducing the voltage drop, the battery's discharge-life time can be extended before reaching the minimum battery voltage.

However, in the practical application of the aforementioned handheld devices, electric motors, electric cars and the like, their batteries are secondary batteries (such as lithium batteries). In addition to consider the extension of the discharge-life time of the battery, in fact, another important factor to be considered is the battery cycle life. The circuit design of the PCT publication, WO01/89058A1, merely considers the extension of the discharge-life time of the battery, but does not consider that the electricity quality is affected by the secondary battery's dynamic response when using the secondary battery in practice. Thus, the circuit design of the PCT publication, WO01/89058A1, does not consider the battery cycle life when using the secondary battery in practice.

SUMMARY

An objective of the present disclosure is used to provide an energy storage system. In the present disclosure, the battery device composed of at least one secondary battery and the capacitor device composed of at least one capacitor are electrically connected to each other in parallel, and by combining with the DC/DC converter (Direct Current to Direct Current converter), configuring the relation between the equivalent series resistor of the capacitor device and the internal resistor of the battery device, and/or configuring the upper current limit of the rated current of range the DC/DC converter, the battery cycle life of the secondary battery is increased.

To achieve the above objective, the present disclosure provides an energy storage system, at least comprising: a battery device, having an internal resistor; a first terminal and a second terminal, wherein the first terminal and the second terminal are respectively connected to two electrodes of a battery device, and polarities of the two electrodes of the battery device are opposite to each other; a capacitor device, electrically connected to the first terminal and the second terminal in parallel, and the capacitor device has an equivalent series resistor; and a DC/DC converter, electrically connected between the first terminal and the capacitor device; wherein a resistance of the equivalent series resistor is larger than that of the internal resistor.

In one embodiment of the present disclosure, the energy storage system further comprises a third terminal, and the third terminal is electrically connected between the DC/DC converter and the capacitor device.

In one embodiment of the present disclosure, the third terminal is used to provide electricity from the capacitor device to a load.

In one embodiment of the present disclosure, the third terminal is used to provide electricity from an external power to the battery device.

In one embodiment of the present disclosure, the battery device is a secondary battery or formed by connecting secondary batteries in parallel or in series.

In one embodiment of the present disclosure, the capacitor device is a capacitor or formed by connecting capacitors in parallel or in series. The capacitor can be a super capacitor, multilayer ceramic capacitor, tantalum capacitor or electrolytic capacitor, and the present disclosure is not limited thereto.

In one embodiment of the present disclosure, the DC/DC converter has a rated current range, the rated current range has an upper current limit and a lower current limit, the equivalent series resistor of the capacitor device has a lower resistance limit, the lower resistance limit is calculated and obtained according to the upper current limit, and the resistance of the equivalent series resistor is not less than the lower resistance limit.

The present disclosure provides another one energy storage system, at least comprising: a battery device, having an internal resistor; a first terminal and a second terminal, wherein the first terminal and the second terminal are respectively connected to two electrodes of a battery device, and polarities of the two electrodes of the battery device are opposite to each other; a capacitor device, electrically connected to the first terminal and the second terminal in parallel, and the capacitor device has an equivalent series resistor; and a DC/DC converter, electrically connected between the first terminal and the capacitor device, wherein the DC/DC converter has a rated current range, the rated current range has an upper current limit and a lower current limit; wherein a resistance of the equivalent series resistor of the capacitor device is larger than or equal to a lower resistance limit, the lower resistance limit is calculated by using equation (1):

$$V = I\left(\frac{\Delta t}{C} + R\right); \qquad \text{equation (1)}$$

wherein V is a rated voltage of the capacitor device, I is the upper current limit of the DC/DC converter, C is a capacitance of the capacitor device, $\Delta t$ is a charging/discharging time of the capacitor device, R is the lower resistance limit of the equivalent series resistor of the capacitor device.

The present disclosure utilizes the capacitor device to directly decouple a transient voltage generated at the output end of the DC/DC converter, such that the ripple current is smoother, the effect of the circuit operation quality caused by the dynamic response of the battery device is reduced, and the output electricity is more stable. Accordingly, the cycle life of the battery device can be indirectly extended, and the decline of the battery device can be suppressed.

BRIEF DESCRIPTIONS OF DRAWINGS

DETAILED DESCRIPTION OF THE PREFERRED EMBODIMENTS

In order to facilitate the examiner to understand the technical features, the contents and the advantages of the present disclosure, as well as the efficacy that can be reached by the present disclosure, the present disclosure will now be described in detail with the drawings and the form of expression of the embodiments. The drawings used are only for illustration and support of the specification, and hence are not necessarily accurate in scale and precise in configuration after implementation of the present disclosure. Therefore, it should not be interpreted based upon the scale and the configuration on the drawings to confine the scope of the rights claimed on the practical implementation of the present disclosure.

Figure 1:
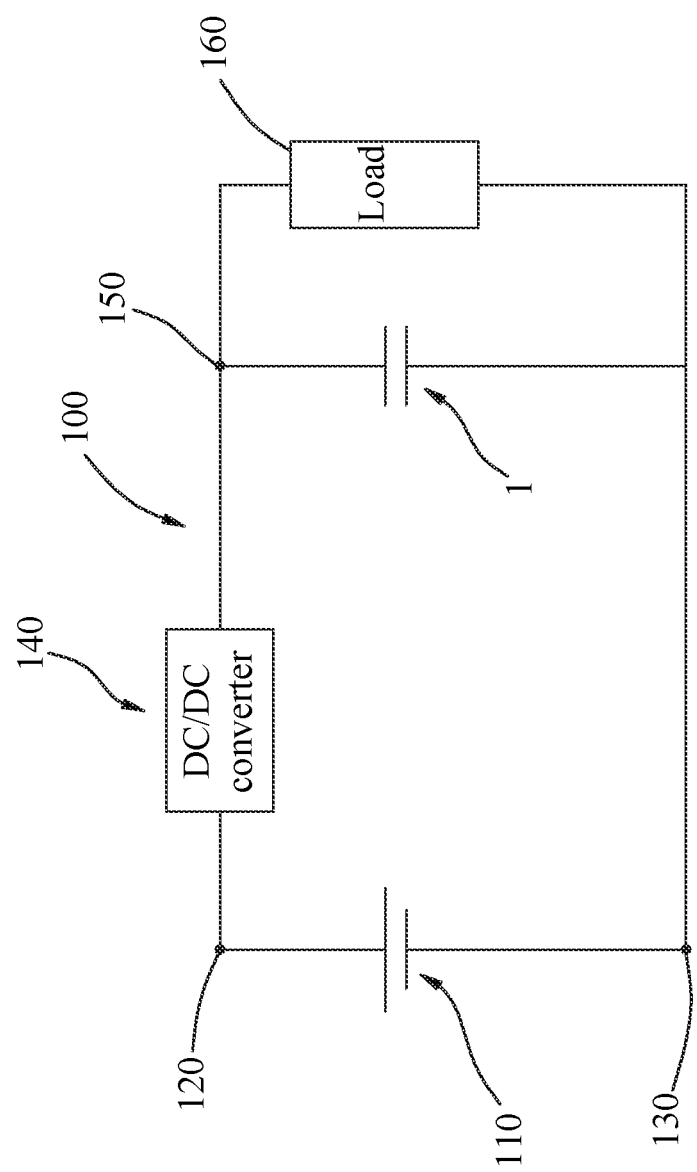
FIG. 1 is a schematic diagram of an implementation of an energy storage system according to an embodiment of the present disclosure.

Firstly, as shown in FIG. 1, the energy storage system 100 of the present disclosure at least comprises a battery device 110, a first terminal 120, a second terminal 130, a capacitor device 1 and a DC/DC converter 140.

The battery device 110 has an internal resistor. The battery device 110 is a secondary battery or formed by connecting secondary batteries in parallel or in series. Herein, the battery device 110 of the illustrated embodiment is one secondary battery for example, the battery device 110 has two electrodes, and the two electrodes have polarities opposite to each other, such as a positive electrode and a negative electrode. In the example that the battery device 110 is formed by connecting secondary batteries in parallel or in series, an internal resistor of the battery device 110 is a total internal resistor calculated according to internal resistors of the secondary batteries connected in parallel or in series.

The first terminal 120 and the second terminal 130 are respectively electrically connected to the two electrodes of the battery device 110, for example, the first terminal 120 is connected to the positive electrode of the battery device 110, and the second terminal 130 is electrically connected to the negative electrode of the battery device 110.

The capacitor device 1 is electrically connected to the first terminal 120 and the second terminal 130 in parallel, and the capacitor device 1 has an equivalent series resistor. That is, the capacitor device 1 is connected to the battery device 110 in parallel, and the capacitor device 1 and the battery device 110 are connected between the first terminal 120 and the second terminal 130 in parallel. The capacitor device 1 can be a capacitor or formed by connecting capacitors in parallel or in series. The capacitor can be a super capacitor, multi-layer ceramic capacitor, tantalum capacitor or electrolytic capacitor, and the present disclosure is not limited thereto. In the example that the capacitor device 1 is formed by connecting capacitors in parallel or in series, the equivalent series resistor of the capacitor device 1 is a total equivalent series resistor calculated according to the resistors of the capacitors connected in series or in parallel.

The DC/DC converter 140 is electrically between the first terminal 120 and the capacitor device 1, the DC/DC converter 140 has a rated current range (or current rating), and the rated current range has an upper current limit and a lower current limit, for example, the rated current range is 2 A through 0.2 A, the upper current limit is 2 A, and the lower current limit is 0.2 A. The DC/DC converter 140 can be a boost converter or a buck converter.

Figure 2:
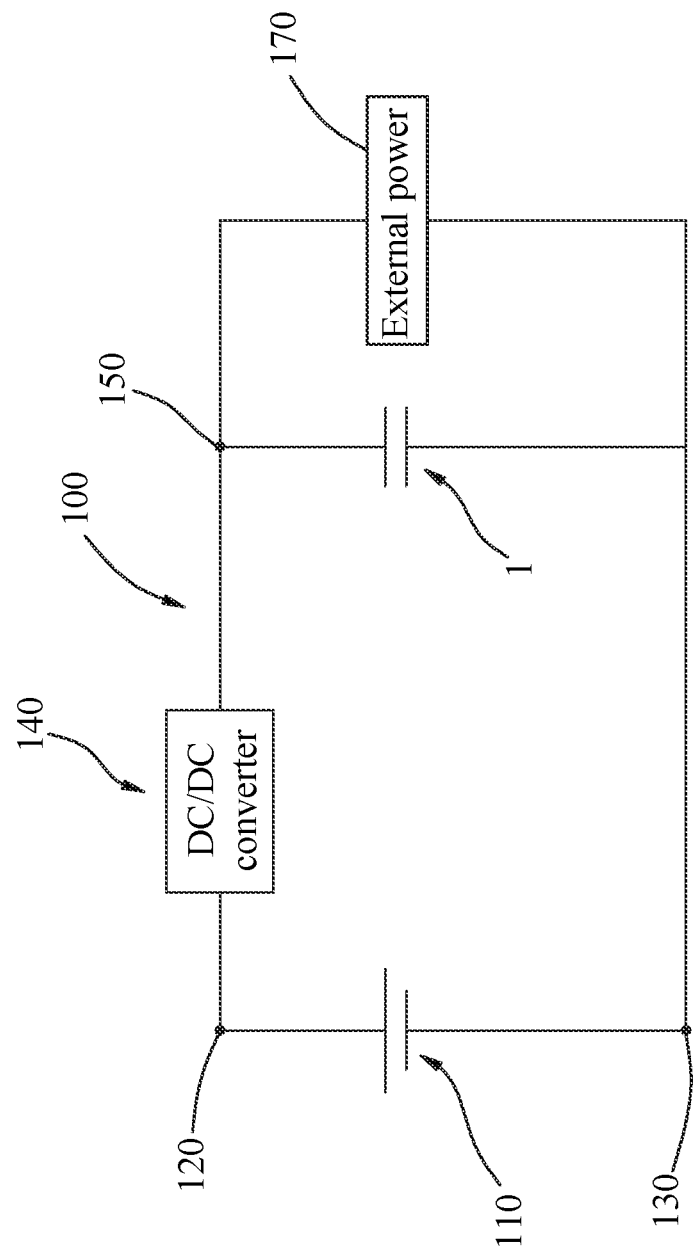
FIG. 2 is a schematic diagram of an implementation of connecting an energy storage system and an external power according to an embodiment of the present disclosure.
Figure 3:
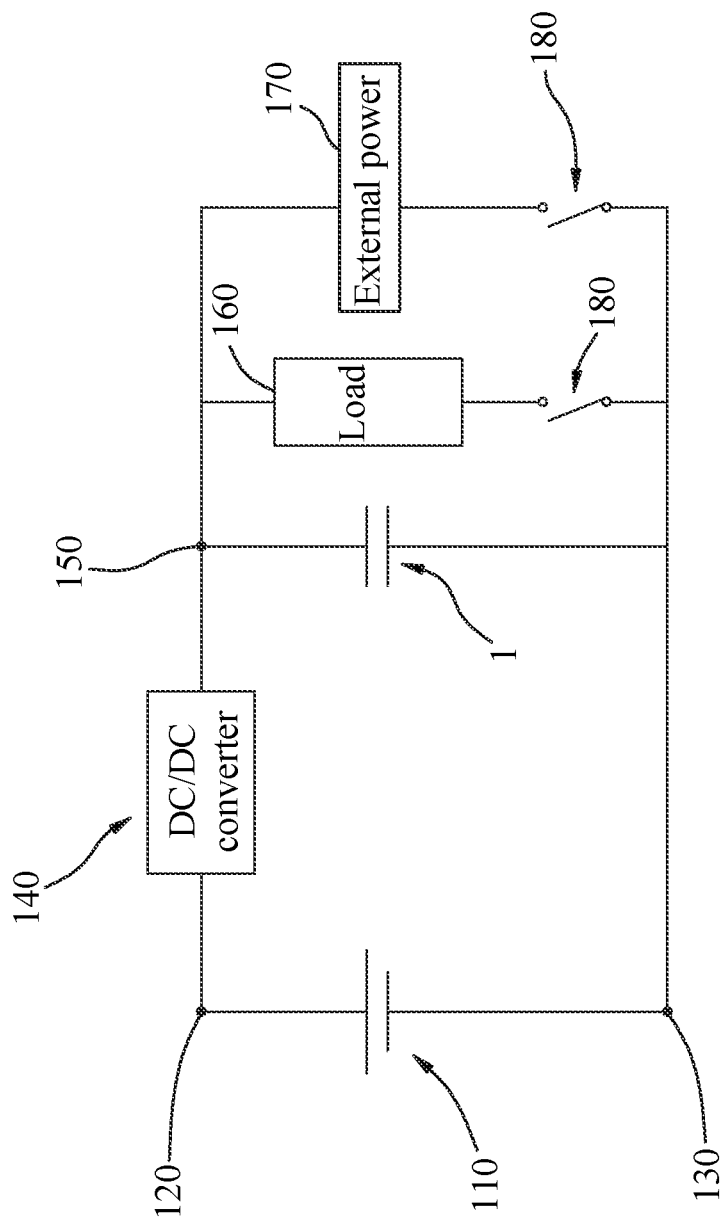
FIG. 3 is a schematic diagram of an implementation of switching an energy storage system to connect with a load or an external power via two switches according to an embodiment of the present disclosure.

The energy storage system 100 further comprises a third terminal 150, the third terminal 150 is electrically connected between the DC/DC converter 140 and the capacitor device 1, and the third terminal 150 is used to provide the electricity to a load 160 from the capacitor device 1, as shown in FIG. 1. Or alternatively, as shown in FIG. 2, the third terminal 150 is used to provide the electricity to the battery device 110 from the external power 170 via the first terminal 120. Certainly, there are multiple devices connected between the first terminal 120 and the second terminal 130 in parallel, as shown in FIG. 3, and two switches 180 in the energy storage system 100 are used to control the third terminal 150 to provide the electricity to the load 160 from the capacitor device 1 or to provide the electricity to the battery device 110 from the external power 170 via the first terminal 120. It is noted that, the load 160 is a load of a smart watch, smart glasses, phone, electronic lock, electric tooth brush, hand tool or electric car, and the present disclosure is not limited thereto.

When operating in practice, the energy storage system 100 allows the current to flow between the battery device 110 an the capacitor device 1 in dual ways so as to charge and discharge the battery device 110, for example, the bidirectional DC-DC converter is adopted. Further in the energy storage system 100, the cycle number which the capacitor device 1 can be charged and discharged is larger than the cycle number the battery device 110 can be charged and discharged, thus the capacitor device 1 and the battery device 110 in the energy storage system 100 are electrically connected in parallel, so as to enhance the cycle life of the battery device 110. Further, when the electricity is provided to the load 160 from the capacitor device 1 via the third terminal 150 (see FIG. 2), since the DC/DC converter 140 of the energy storage system 100 is electrically connected between the first terminal 120 and the capacitor device 1, the capacitor device 1 is able to decouple the transient voltage generated by the output end of the DC/DC converter 140. Therefore, the ripple current is smoother, the effect of the circuit operation quality caused by the dynamic response of the battery device 110 is reduced, and the output electricity is more stable. Accordingly, the cycle life of the battery device 110 is indirectly increased, and the decline of the battery device 110 can be suppressed. Preferably, the resistance of the equivalent series resistor is larger than that of the internal resistor. Specifically, the equivalent series resistor of the capacitor device 1 has a lower resistance limit, and the lower resistance limit is calculated according to the upper current limit, and the resistance of the equivalent series resistor is not less than the lower resistance limit. The lower resistance limit is calculated based upon equation (1):

$$V = I\left(\frac{\Delta t}{C} + R\right); \quad \text{equation (1)}$$

wherein V is a rated voltage of the capacitor device, I is the upper current limit of the DC/DC converter, C is a capacitance of the capacitor device, $\Delta t$ is a charging/discharging time of the capacitor device, R is the lower resistance limit of the equivalent series resistor of the capacitor device.

The analysis method of the cycle life:

In embodiments 1 through 3 and comparative examples 1 through 3, charging and discharging cycles of lithium batteries are tested in the following condition: a constant current-constant voltage (CCCV) charging mode and a constant power discharging mode are used, wherein the cut-off voltage of charging is 5 volts, a charging current is 2 A, a cut-off voltage of discharging is 2.8 volts and a discharging current is 2 A. The cycle life is defined as the cycle number which the tested lithium battery can be charged and discharged before the capacitance of the lithium battery drops to 80% of the original capacitance of the lithium battery. It is noted that, embodiments 1 through 3 utilize the architecture of the energy storage system 100, and comparative examples 1 through 3 utilize the architecture of the energy storage system 100 which the capacitor device 1 is removed therefrom. In other words, the differences between the embodiments 1 through 3 and comparative examples 1 through 3 are the existence of the capacitor device 1.

Figure 4:
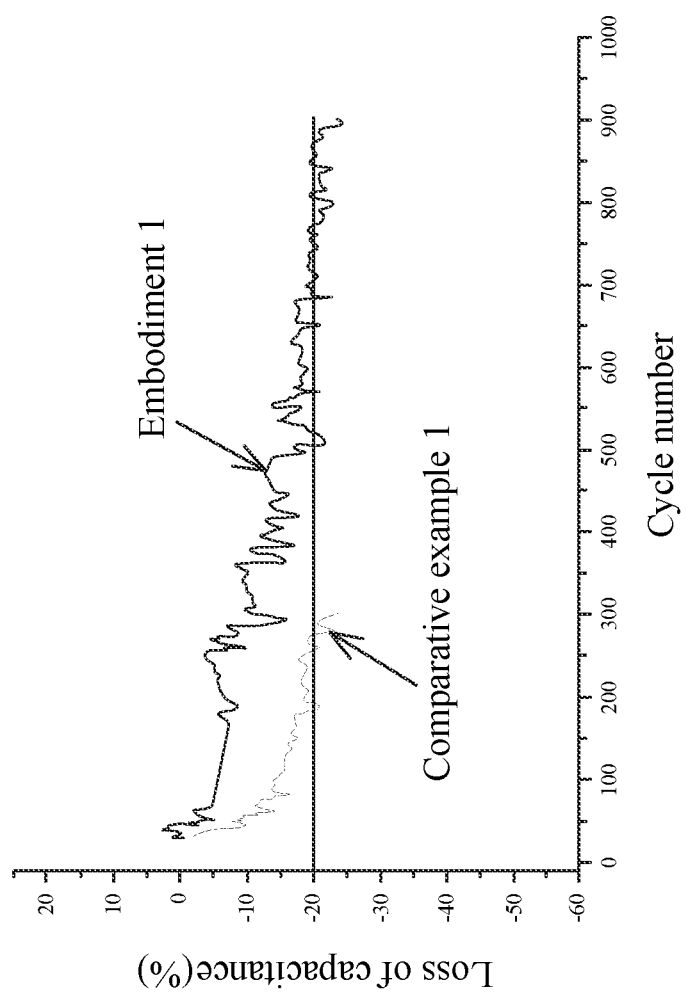
FIG. 4 is a schematic diagram showing charging/discharging cycle test results of comparative example 1 and embodiment 1 of the energy storage system of the present disclosure.

Analysis Result of the Cycle Life:

Test results of cycle life in embodiment 1 and comparative example 1: the battery device 110 in embodiment 1 and comparative example 1 is a lithium polymer battery of Sanyo UF515761ST, which has a rated voltage being 3.7 volts, a rated capacity being 2600 mAh and an internal resistor being less than 38 mΩ; the upper current limit of the DC/DC converter 140 is 2 A; the capacitor device 1 is selected as follows: the lower resistance limit R of the equivalent series resistor of the capacitor device 1 is calculated based upon equation (1), wherein the rated voltage V of the capacitor device 1 is 5.0 volts, the upper current limit I of the DC/DC converter 140 is 2 A, the capacitance C of the capacitor device 1 is 80 mF, the charging/discharging time $\Delta t$ of the capacitor device 1 is 10 ms, and after equation (1) is calculated, the lower resistance limit R of the equivalent series resistor of the capacitor device 1 is 2.375Ω, and thus the capacitor device 1 which has the equivalent series resistor being 2.375Ω is selected. It is noted that the resistance of the equivalent series resistor (being 2.375Ω) is larger than that of the internal resistor (being less than 38 mΩ). The test results are: when the capacitance of the lithium polymer battery of Sanyo UF515761ST drops 80% of the original capacitance (see the Y axis in FIG. 4, the Y axis marked with "−20%" means the 20% loss of the capacitance), the cycle number of embodiment 1 is 690 times, the cycle number of comparative example 1 is 240 times, and thus, by using the energy storage system 100, the cycle life of the lithium polymer battery of Sanyo UF515761ST is increased to 2.875 times (i.e. 690/240), as shown in FIG. 4. In addition, for the $245^{th}$ cycle, the capacitance loss of embodiment 1 is merely 4.9%, and the capacitance loss of comparative example 1 is 19.5%. Accordingly, by using the energy storage system 100, the cycle life of the lithium polymer battery of Sanyo UF515761ST is enhanced as well as the operation time.

Figure 5:
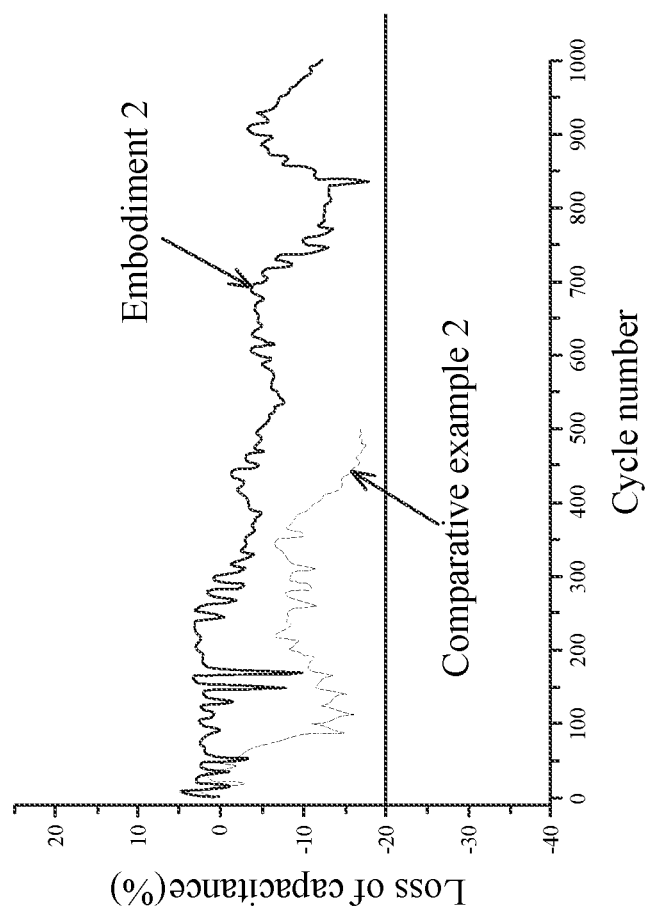
FIG. 5 is a schematic diagram showing charging/discharging cycle test results of comparative example 2 and embodiment 2 of the energy storage system of the present disclosure.

Test results of cycle life in embodiment 2 and comparative example 2: the battery device 110 in embodiment 2 and comparative example 2 is a lithium polymer battery of LG ICP3339105L1, which has a rated voltage being 3.7 volts, a rated capacity being 2060 mAh and an internal resistor being equal to or less than 30 mΩ; the upper current limit of the DC/DC converter 140 is 2 A; the capacitor device 1 is selected as follows: the lower resistance limit R of the equivalent series resistor of the capacitor device 1 is calculated based upon equation (1), wherein the rated voltage V of the capacitor device 1 is 5.0 volts, the upper current limit I of the DC/DC converter 140 is 2 A, the capacitance C of the capacitor device 1 is 80 mF, the charging/discharging time $\Delta t$ of the capacitor device 1 is 10 ms, and after equation (1) is calculated, the lower resistance limit R of the equivalent series resistor of the capacitor device 1 is 2.375Ω, and thus the capacitor device 1 which has the equivalent series resistor being 2.375Ω is selected. It is noted that the resistance of the equivalent series resistor (being 2.375Ω) is larger than that of the internal resistor (being less than or equal to 30 mΩ). The test results are: when the capacitance of the lithium polymer battery of LG ICP3339105L1 drops 80% of the original capacitance (see the Y axis in FIG. 5, the Y axis marked with "−20%" means the 20% loss of the capacitance), the cycle number of embodiment 2 is more than 1000 times, the cycle number of comparative example 2 is about 500 times, and thus, by using the energy storage system 100, the cycle life of the lithium polymer battery of Sanyo LG ICP3339105L1 is increased to 2 times (i.e. 1000/500), as shown in FIG. 5.

Figure 6:
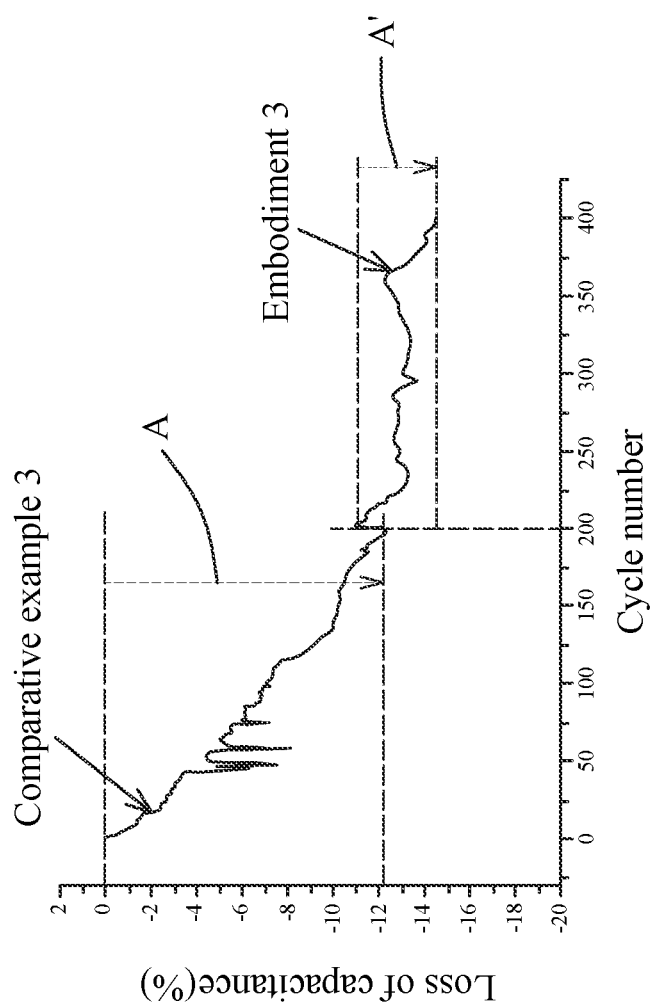
FIG. 6 is a schematic diagram showing charging/discharging cycle test results of comparative example 3 and embodiment 3 of the energy storage system of the present disclosure.

Test results of cycle life in embodiment 3 and comparative example 3: the battery device 110 in in embodiment 3 and comparative example 3 is a lithium ion battery of Maxell ICP575673, which has a rated voltage being 3.8 volts, a rated capacity being 3100 mAh and an internal resistor being equal to or less than 70 mΩ; the upper current limit of the DC/DC converter 140 is 2 A; the capacitor device 1 is selected as follows: the lower resistance limit R of the equivalent series resistor of the capacitor device 1 is calculated based upon equation (1), wherein the rated voltage V of the capacitor device 1 is 5.0 volts, the upper current limit I of the DC/DC converter 140 is 2 A, the capacitance C of the capacitor device 1 is 80 mF, the charging/discharging time Δt of the capacitor device 1 is 10 ms, and after equation (1) is calculated, the lower resistance limit R of the equivalent series resistor of the capacitor device 1 is 2.375Ω, and thus the capacitor device 1 which has the equivalent series resistor being 2.375Ω is selected. It is noted that the resistance of the equivalent series resistor (being 2.375Ω) is larger than that of the internal resistor (being less than or equal to 70 mΩ). The test manner is: after the lithium ion battery of Maxell ICP575673 in comparative example 3 is charged and discharged 200 times, and then the lithium ion battery of Maxell ICP575673 of embodiment 3 is charged and discharged 200 time again by using the energy storage system 100, in other words, the lithium ion battery of Maxell ICP575673 being charged and discharged 200 times is the battery device 110 in embodiment 3, and the battery device 110 in embodiment 3 is charged and discharged 200 time again. The test results are: the lithium ion battery of Maxell ICP575673 in comparative example 3 has a decline rate A being 12.3%, as shown in FIG. 6; however, the lithium ion battery of Maxell ICP575673 in embodiment 3 has a decline rate A merely being 2.3%. Thus, by using the energy storage system 100 of embodiment 3, the decline of the capacity of the lithium ion battery of Maxell ICP575673 (battery device 110) can be obviously suppressed.

Accordingly, by connecting the battery device 100 composed of the at least one secondary battery and the capacitor device 1 in parallel, combining the DC/DC converter 140 in the energy storage system 100, configuring the relation of the equivalent series resistor and the internal resistor, and or configuring the relation of the equivalent series resistor and the upper current limit, the battery cycle life of the secondary battery is indeed extended.

Figure 7:
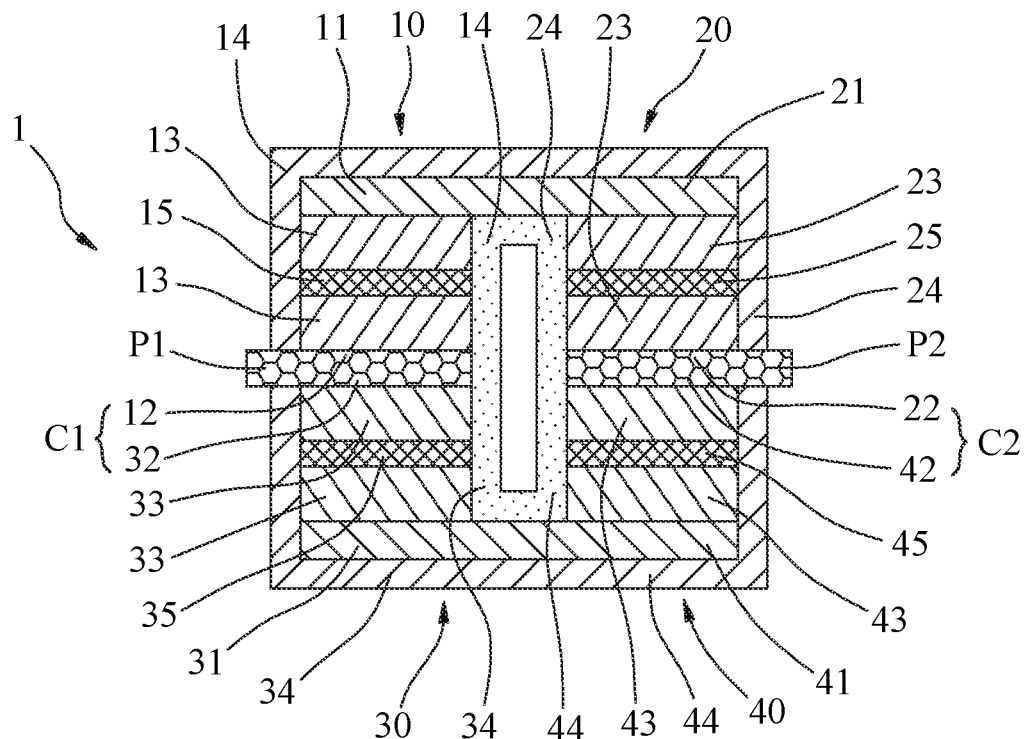
FIG. 7 is a schematic diagram showing a structure of a capacitor device of an energy storage system according to a first embodiment of the present disclosure.

Manufacturing of the Capacitor Device 1:

Refer to FIG. 7, and the capacitor device 1 of the first embodiment comprises a first capacitor 10, a second capacitor 20, a third capacitor 30 and a fourth capacitor 40.

The first capacitor 10 has first electrode 11, a second electrode 12, a first electrolyte layer 13 and a first encapsulation body 14, wherein the second electrode 12 is disposed opposite to the first electrode 11, the first electrolyte layer 13 is disposed between the first electrode 11 and the second electrode 12, and the first encapsulation body 14 encapsulates the first electrode 11, the second electrode 12 and the first electrolyte layer 13.

The second capacitor 20 has a third electrode 21, a fourth electrode 22, a second electrolyte layer 23 and a second encapsulation body 24, wherein the fourth electrode 22 is disposed opposite to the third electrode 21, the second electrolyte layer 23 is disposed between the third electrode 21 and the fourth electrode 22, and the second encapsulation body 24 encapsulates the third electrode 21, the fourth electrode 22 and the second electrolyte layer 23.

The third capacitor 30 has a fifth electrode 31, a sixth electrode 32, a third electrolyte layer 33 and a third encapsulation body 34, wherein the sixth electrode 32 is disposed opposite to the fifth electrode 31, the third electrolyte layer 33 is disposed between the fifth electrode 31 and the sixth electrode 32, and the third encapsulation body 34 encapsulates the fifth electrode 31, the sixth electrode 32 and the third electrolyte layer 33.

The fourth capacitor 40 has a seventh electrode 41, an eighth electrode 42, a fourth electrolyte layer 43 and a fourth encapsulation body 44, wherein the eighth electrode 42 is disposed opposite to the seventh electrode 41, the fourth electrolyte layer 43 is disposed between the seventh electrode 41 and the eighth electrode 42, and the fourth encapsulation body 44 encapsulates the seventh electrode 41, the eighth electrode 42 and the fourth electrolyte layer 43.

The first electrode 11 and the third electrode 21 are integrally formed, the fifth electrode 31 and the seventh electrode 41 are integrally formed, the second electrode 12 and the sixth electrode 32 are integrally formed, and the fourth electrode 22 and the eighth electrode 42 are integrally formed. The second electrode 12 and the fourth electrode 22 are electrically insulated from each other. The first electrolyte layer 13, the second electrolyte layer 23, the third electrolyte layer 33 and the fourth electrolyte layer 43 are independent to each other without contacting. It is noted that the term "formed integrally" (or called "integrated molding") means "formed by the same process without assembly". For example, "the first electrode 11 and the third electrode 21 are formed integrally" means "the first electrode 11 and the third electrode 21 are formed by cutting an electrode plate to a predetermined shape (such as, rectangular sheet)". Thus, the first electrode 11 and the third electrode 21 are formed by the same electrode plate processed with a cutting process, and have the integrity of the integrated molding. The term "without assembly" means the two electrode plates are not combined via welding, bonding or one of other manners. For example, the first electrode 11 and the third electrode 21 are integrally formed without welding or adhesion of conducting glue.

The capacitor device 1 further has a first lead electrode P1 and a second lead electrode P2, the first lead electrode P1 is electrically connected to the second electrode 12, and the second lead electrode P2 is electrically connected to the fourth electrode 22. Preferably, the first lead electrode P1 and the second electrode 12 are formed integrally, and the second lead electrode P2 and the fourth electrode 22 are formed integrally.

The first electrode 11, the second electrode 12, the third electrode 21, the fourth electrode 22, the fifth electrode 31, the sixth electrode 32, the seventh electrode 41, the eighth electrode 42, the first lead electrode P1 and the second lead electrode P2 are made of conductive material which has electron conducting ability. Each of them can be independent metal foil, metal plate, metal mesh, activated carbon coated metal mesh, activated carbon coated metal sheet, activated carbon coated metal foil, activated carbon cloth, activated carbon fiber, metal composite mesh, metal composite sheet, transition metal oxide layer or plate made of transition metal oxide, or conductive polymer layer made of conductive polymer. Preferably, the first electrode 11, the second electrode 12, the third electrode 21, the fourth electrode 22, the fifth electrode 31, the sixth electrode 32, the seventh electrode 41, the eighth electrode 42, the first lead electrode P1 and the second lead electrode P2 can be nickel metal foils. More preferably, the first electrode 11, the second electrode 12, the third electrode 21, the fourth electrode 22, the fifth electrode 31, the sixth electrode 32, the seventh electrode 41, the eighth electrode 42, the first lead electrode P1 and the second lead electrode P2 can be nickel metal foils which surfaces are coated with activated carbon layers.

The first electrolyte layer 13, the second electrolyte layer 23, the third electrolyte layer 33 and the fourth electrolyte layer 43 are electrolyte layers composed of the electrolytes, and preferably, the aqueous electrolyte layers composed of aqueous electrolytes. The aqueous electrolyte is, for example, an aqueous solution of lithium, sodium, potassium salts, or any combination thereof.

The first encapsulation body 14, the second encapsulation body 24, the third encapsulation body 34 and the fourth encapsulation body 44 are insulation layers made of insulation material, and the insulation material preferably has the characteristics of resistance to acid and alkali, high waterproof and gas permeation resistance, such as glue or thermosetting epoxy molding compound (EMC).

Interior of the first electrolyte layer 13 can be disposed with a first isolation film 15 having an ion conduction ability, interior of the second electrolyte layer 23 can be disposed with a second isolation film 25 having an ion conduction ability, interior of the third electrolyte layer 33 can be disposed with a third isolation film 35 having an ion conduction ability, and interior of the fourth electrolyte layer 43 can be disposed with a fourth isolation film 45 having an ion conduction ability. The first isolation film 15, the second isolation film 25, the third isolation film 35 and the fourth isolation film 45 can be a cellulose film, single or multiple layers of polypropylene (PP) film, polyethylene (PE) film, polytetrafluoroethene (PTFE) film, polyvinylidene fluoride (PVDF) Film or a composite film of any combination of the above. It is noted that, when the electrolyte is the solid electrolyte or spacers are inserted, the first isolation film 15, the second isolation film 25, the third isolation film 35 and the fourth isolation film 45 can be removed. The spacers can be ribs, for example, which are disposed between electrodes with gaps therebetween.

Figure 8:
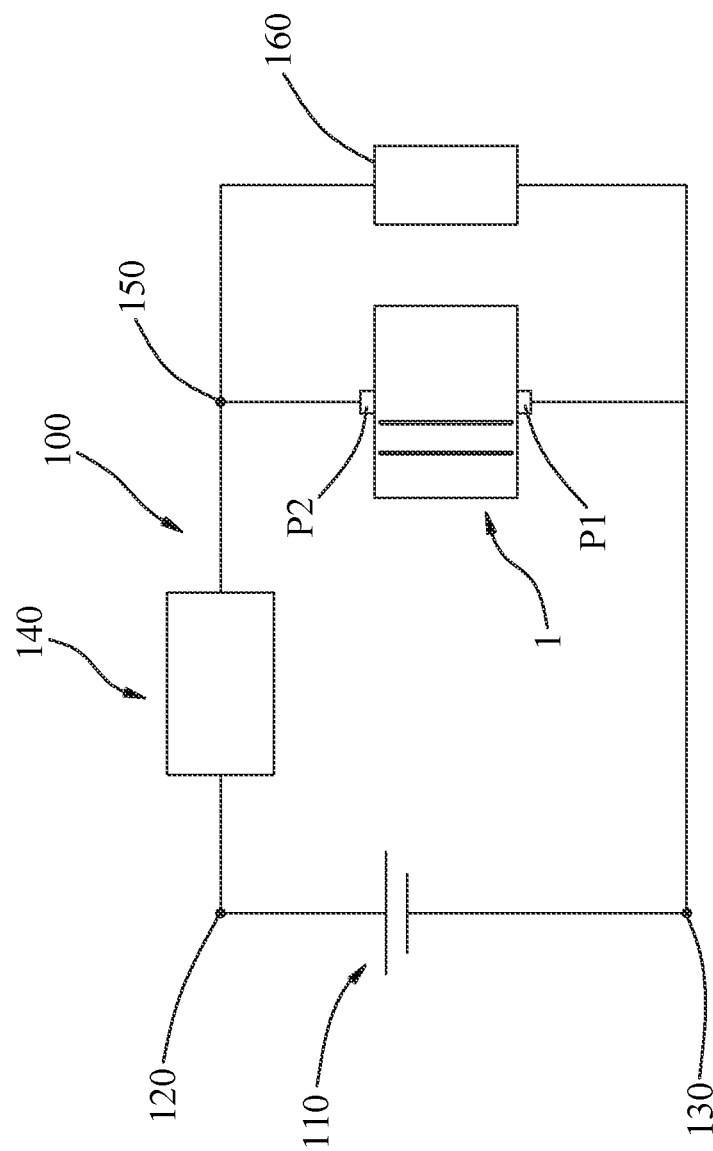
FIG. 8 is a schematic diagram of an implementation of connecting an energy storage system and a capacitor device according to an embodiment of the present disclosure.

When the capacitor device 1 is electrically connected to the battery device 110 in parallel, the first lead electrode P1 and the second terminal 130 are electrically connected to each other, and the second lead electrode P2 is electrically connected to the third terminal 150, so as to charge the battery device 110, as shown in FIG. 8. Refer to FIG. 7 and FIG. 8, in the case of charging, the first lead electrode P1, the second electrode 12, the sixth electrode 32, the third electrode 21 and the seventh electrode 41 have the same electrode polarity (such as, the polarity of the negative electrode), and the second lead electrode P2, the fourth electrode 22, the eighth electrode 42, the first electrode 11 and the fifth electrode 31 have the other same electrode polarity (such as, the polarity of the positive electrode.

When the capacitor device 1 and the load 160 are connected for discharging, the first lead electrode P1, the second electrode 12, the sixth electrode 32, the third electrode 21 and the seventh electrode 41 the same electrode polarity (such as, the polarity of the negative electrode), the second lead electrode P2, the fourth electrode 22, the eighth electrode 42, the first electrode 11 and the fifth electrode 31 have the other same electrode polarity (such as, the polarity of the positive electrode.

When the capacitor device 1 is charged or discharged, since the first electrode 11 of the first capacitor 10 and the third electrode 21 of the second capacitor 20 are formed integrally, the first capacitor 10 and the second capacitor 20 are connected in series; and since the third electrode 31 of the third capacitor 30 and the seventh electrode 41 of the fifth electrode 31 are formed integrally, the third capacitor 30 and the fourth capacitor 40 are formed integrally. Accordingly, the capacitor device 1 has a high voltage by using the serial connection.

When charging or discharging the capacitor device 1, since the second electrode 12 of the first capacitor 10 and the sixth electrode 32 of the third capacitor 30 are formed integrally, the first capacitor 10 and third capacitor 30 are connected in parallel, and since the fourth electrode 22 of the second capacitor 20 and the eighth electrode 42 of the fourth capacitor 40 are formed integrally, the second capacitor 20 and fourth capacitor 40 are connected in parallel, which results a high capacitance of the capacitor device by using such parallel connection, It is noted that, the first capacitor 10, the second capacitor 20, the third capacitor 30 and the fourth capacitor 40 can be independent super capacitors. The first encapsulation body 14, the second encapsulation body 24, the third encapsulation body 34 and the fourth encapsulation body 44 are independently insulated from the first electrode 11, the second electrode 12, the third electrode 21, the fourth electrode 22, the fifth electrode 31, the sixth electrode 32, the seventh electrode 41, the eighth electrode 42, the first lead electrode P1 and the second lead electrode P2. For example, the first capacitor 10, the second capacitor 20, the third capacitor 30 and the fourth capacitor 40 have A volts and B farads, and since the first capacitor 10 and the second capacitor 20 are connected in series, the third capacitor 30 and the fourth capacitor 40 are connected in parallel, the capacitor device 1 has a high voltage of 2 A volts. Since the first capacitor 10 and the third capacitor 30 are connected in series, and the second capacitor 20 and the fourth capacitor 40 are connected in parallel, the capacitor device 1 has a high capacitance of 2 B farads. In addition, preferably, the first encapsulation body 14, the second encapsulation body 24, the third encapsulation body 34 and the fourth encapsulation body 44 are formed integrally, and thus in the interior of the capacitor device 1, the serial and parallel connections of the first capacitor 10, the second capacitor 20, the third capacitor 30 and the fourth capacitor 40 are formed.

It is noted that, the capacitor device 1 has at least one common electrode, and the common electrode means a same electrode plate utilized between at least two capacitors, and each of a top surface and a bottom surface of the common electrode forms at least one capacitor. That is, a top and bottom surface of the common electrode thus can be utilized at the same time, which is not like the conventional electrode which one of a top surface and a bottom surface is merely utilized. Therefore, the capacitor device utilizing the common electrode can be used to save the electrode material and decrease the whole thickness, which is helpful to miniaturization of the capacitor device 1. For example, the capacitor device 1 has two common electrodes C1 and C2. The second electrode 12 of the first capacitor 10 and the sixth electrode 32 of the third capacitor 30 are formed integrally, i.e. the second electrode 12 and the sixth electrode 32 are formed by the same electrode plate which is the common electrode C1 of the first capacitor 10 and the third capacitor 30, and the top surface and the bottom surface of the common electrode C1 respectively form the first capacitor 10 and the third capacitor 30. The fourth electrode 22 of the second capacitor 20 and the eighth electrode 42 of the fourth capacitor 40 are formed integrally, i.e. the fourth electrode 22 and the eighth electrode 42 are formed by the same electrode plate which is the common electrode C2 of the second capacitor 20 and the fourth capacitor 40, and the top surface and the bottom surface of the common electrode C2 respectively form the second capacitor 20 and the fourth capacitor 40. Specifically, the four capacitors are divided into two sets, two capacitors of each set are connected in parallel, the conventional manner has total four electrode surfaces which cannot be utilized in capacitor formation and this causes wastes, and the capacitor device formed by the capacitors has a thickness larger than a double thickness of the capacitor (for example, the two capacitors of each set are stacked and connected in parallel). However, by using the common electrode of the present disclosure, the top surface and the bottom surface of the common electrode (such as, the common electrode C1) form the capacitors (such as, the first capacitor 10 and the third capacitor 30), and the common electrode can be fully utilized without wastes. Further, the present disclosure has an unexpected result, since the thickness of the common electrode is the thickness of the single one capacitor (the thickness of the common electrode C1 of FIG. 2), the capacitor device in the present disclosure has a thickness less than a half thickness of the conventional capacitor device, which meets the requirement of miniaturization.

Figure 9:
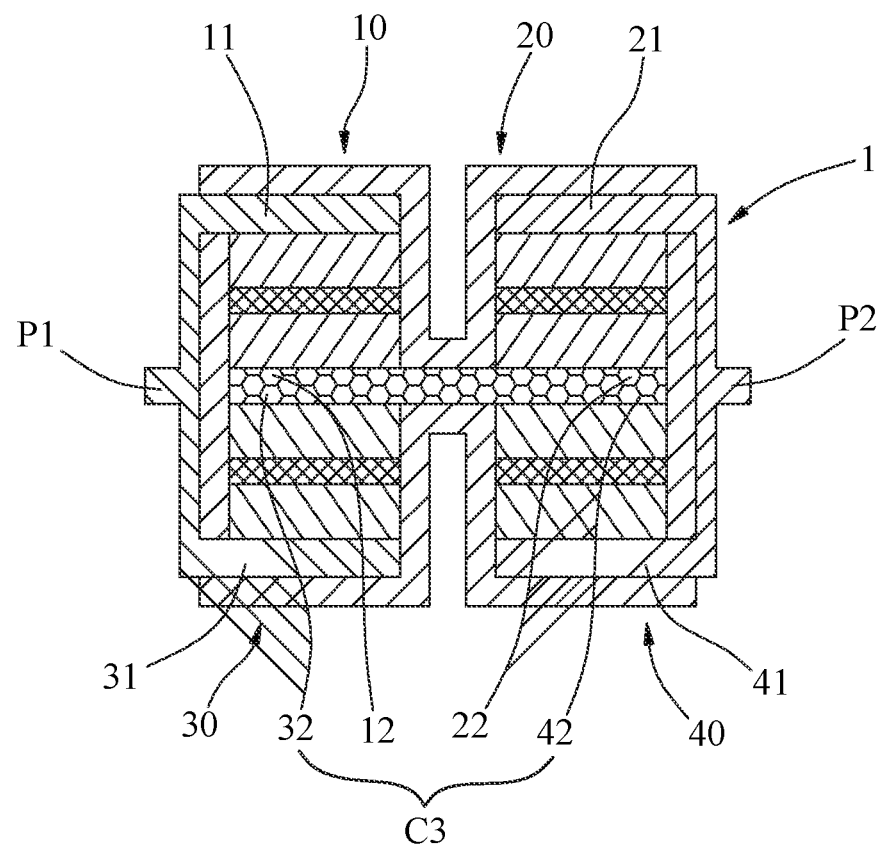
FIG. 9 is a schematic diagram showing a structure of a capacitor device of an energy storage system according to a second embodiment of the present disclosure.

Refer to FIG. 9 which illustrates a second embodiment of the capacitor device 1, the capacitor device 1 in the second embodiment is similar to the capacitor device 1 in the first embodiment, and same parts are not described again. The capacitor devices 1 in the first and second embodiments have the difference as follows: in the second embodiment, the second electrode 12, the fourth electrode 22, the sixth electrode 32 and the eighth electrode 42 of the capacitor device 1 are formed integrally, and first electrode 11 is electrically insulated from the third electrode 21, the fifth electrode 31 is electrically insulated from the seventh electrode 41, the first lead electrode P1 is electrically connected to the first electrode 11 and the fifth electrode 31, and the second lead electrode P2 is electrically connected to the third electrode 21 and the seventh electrode 41. Preferably, the first lead electrode P1, the first electrode 11 and the fifth electrode 31 are formed integrally, and the second lead electrode P2, the third electrode 21 and the seventh electrode 41 are formed integrally.

It is noted that, in the second embodiment, the capacitor device 1 has a common electrode C3. Since the second electrode 12, the fourth electrode 22, the sixth electrode 32 and the eighth electrode 42 are formed integrally, i.e. the second electrode 12, the fourth electrode 22, the sixth electrode 32 and the eighth electrode 42 are formed by the same electrode plate which is the common electrode C3 of the first capacitor 10, the second capacitor 20, the third capacitor 30 and the fourth capacitor 40, a left end and a right end of a top surface of the common electrode C3 respectively form the first capacitor 10 and the second capacitor 20, and a left end and a right end of a bottom surface of the common electrode C3 respectively form the third capacitor 30 and the fourth capacitor 40. By designing the common electrode C3 to be the common electrode of the first capacitor 10, the second capacitor 20, the third capacitor 30 and the fourth capacitor 40, it has the unexpected result as follows: compared to the conventional electrode which uses merely one of the top surface and the bottom surface of the electrode, the capacitor device 1 can save the electrode material, decrease the whole thickness and meet the requirement of miniaturization of the capacitor device 1.

When the capacitor device 1 in the second embodiment is charged or discharged, the first lead electrode P1, the first electrode 11, the fifth electrode 31, the fourth electrode 22 and the eighth electrode 42 have the same electrode polarity (such as, the polarity of the negative electrode), and the second lead electrode P2, the third electrode 21, the seventh electrode 41, the second electrode 12 and the sixth electrode 32 have the other same electrode polarity (such as, the polarity of the positive electrode). Since the second electrode 12 of the first capacitor 10 and the fourth electrode 22 of the second capacitor 20 are formed integrally, the first capacitor 10 and the second capacitor 20 are connected in series, and since the sixth electrode 32 of the third capacitor 30 and the eighth electrode 42 of the sixth electrode 32 are formed integrally, the third capacitor 30 and the fourth capacitor 40 are connected in series. Therefore, the capacitor device 1 has a high voltage by using the serial connection. Since the second electrode 12 of the first capacitor 10 and the sixth electrode 32 of the third capacitor 30 are formed integrally, the first capacitor 10 and the third capacitor 30 are connected in parallel, and since the fourth electrode of the second capacitor 20 and the eighth electrode 42 of the fourth capacitor 40 are formed integrally, the second capacitor 20 and the fourth capacitor 40 are connected in parallel. Therefore, the capacitor device 1 has a high capacitance by using the parallel connection. It is noted that, since the second electrode 12, the sixth electrode 32, the fourth electrode 22 and the eighth electrode 42 are formed integrally, the serial and parallel connections can be formed at the same time. Therefore, in the interior of the capacitor device 1, the serial and parallel connections of the first capacitor 10, the second capacitor 20, the third capacitor 30 and the fourth capacitor 40 are formed.

In the above first and second embodiments, twos of the first capacitor 10, the second capacitor 20, the third capacitor 30 and the fourth capacitor 40 in the capacitor device 1 are connected in series, and other twos are connected in parallel. If the first capacitor 10, the second capacitor 20, the third capacitor 30 and the fourth capacitor 40 in the capacitor device 1 have the same voltage and capacitance, the capacitor device 1 has the voltage of 2 A volts and the capacitance of 2 B farads.

Figure 10A:
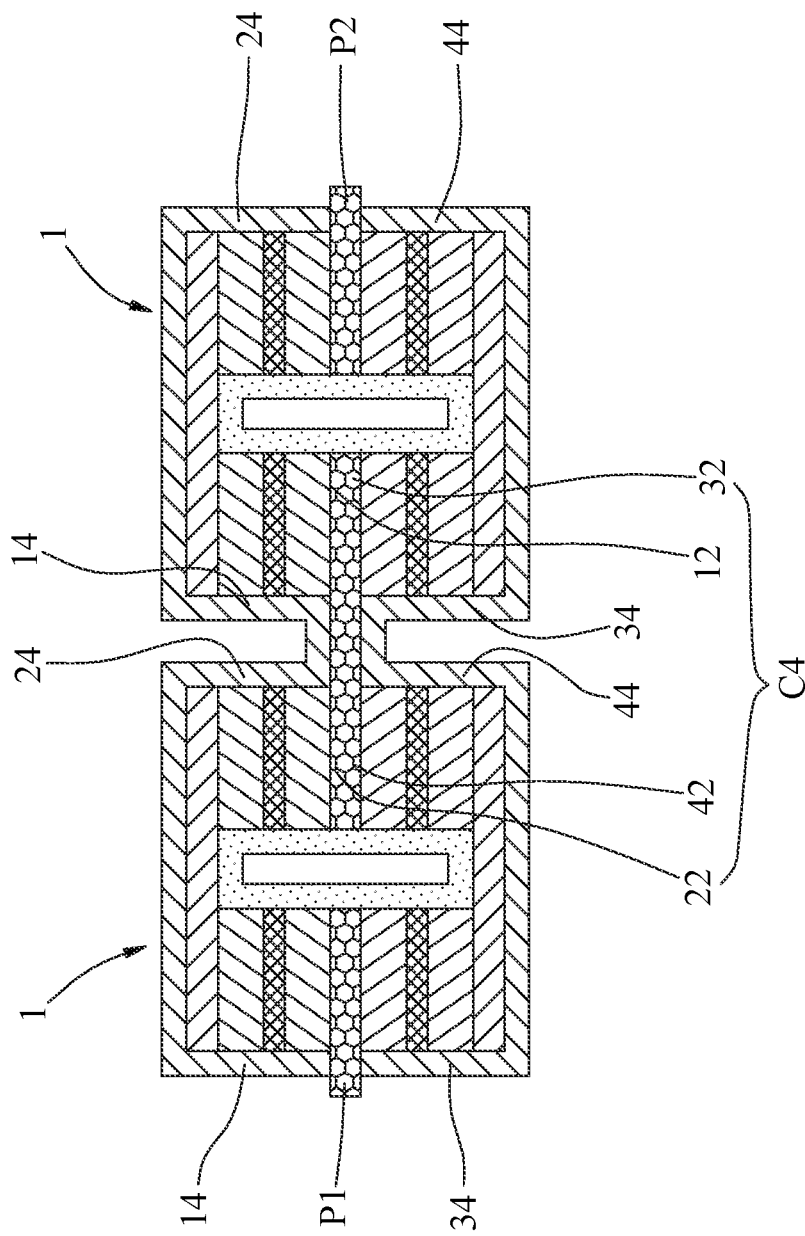
FIG. 10A is a schematic diagram showing a structure of two serially connected capacitor devices of an energy storage system according to a second embodiment of the present disclosure.
Figure 10B:
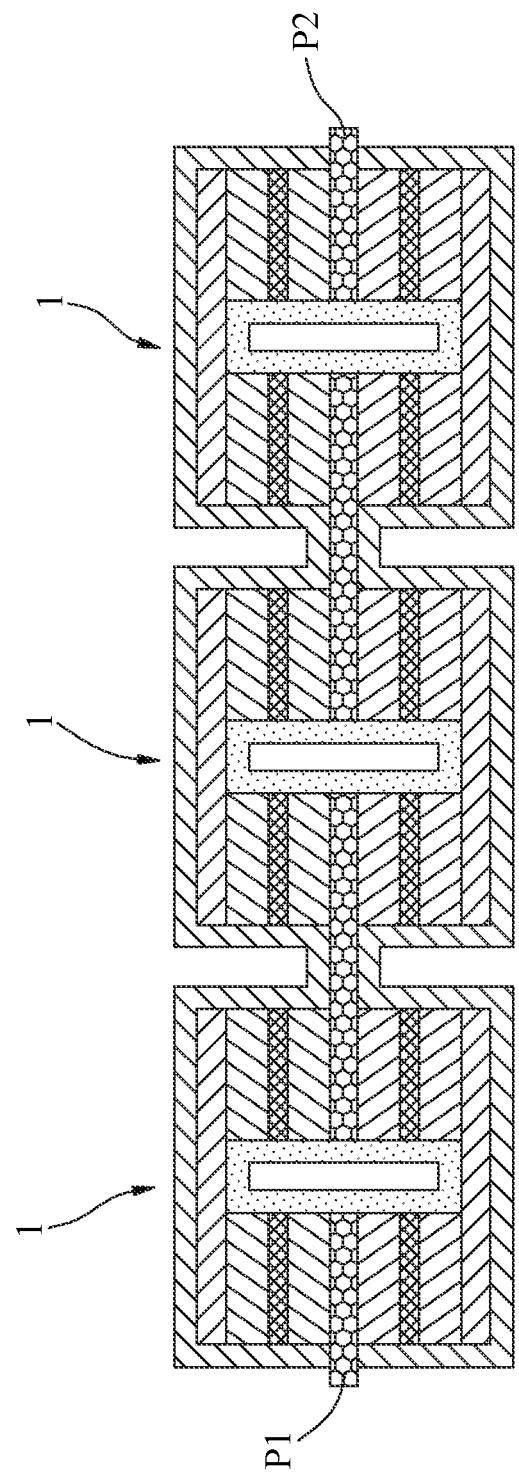
FIG. 10B is a schematic diagram showing a structure of three serially connected capacitor devices of an energy storage system according to a second embodiment of the present disclosure.
Figure 10C:
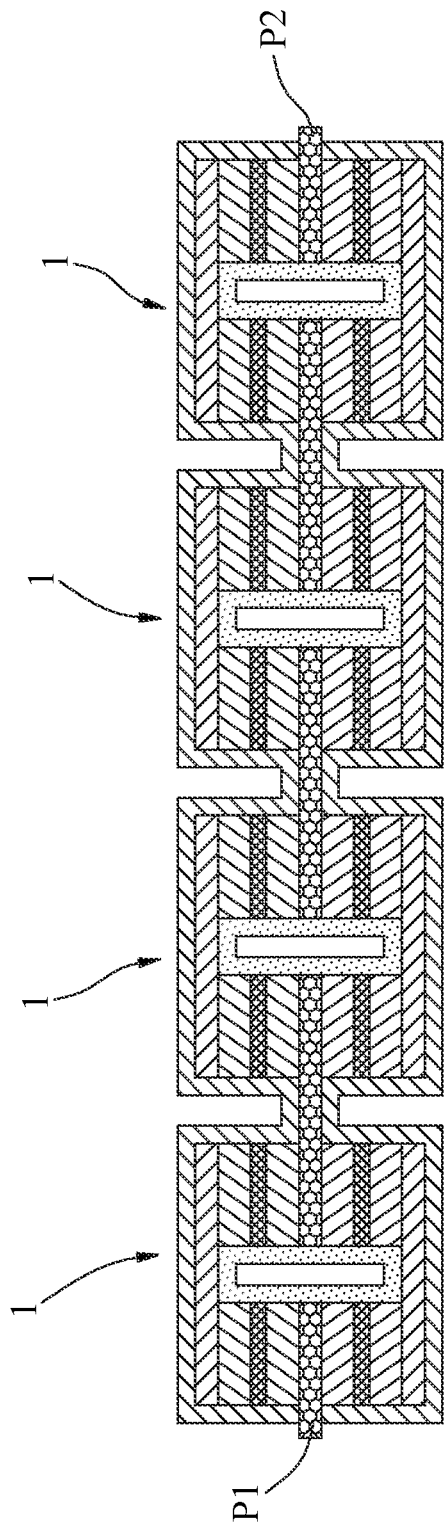
FIG. 10C is a schematic diagram showing a structure of four serially connected capacitor devices of an energy storage system according to a second embodiment of the present disclosure.

Refer to FIG. 10A through FIG. 10C, in the present disclosure, the capacitor devices 1 in the first embodiment are connected in series, wherein the fourth electrode 22 and the eighth electrode 42 of the capacitor device 1, and the second electrode 12 and the sixth electrode 32 of other adjacent capacitor device 1 are formed integrally. In other words, the fourth electrode 22 and the eighth electrode 42 in the capacitor device 1, and the second electrode 12 and the sixth electrode 32 of other adjacent capacitor device 1 are formed by the same electrode plate which is the common electrode C4 of the two adjacent capacitor devices 1 (see FIG. 10A). Thus, the capacitor devices 1 are linearly arranged and the adjacent capacitor devices 1 are connected in series, which can achieve the preset voltage and the preset capacitance. The two capacitor devices 1 in FIG. 10A are connected in series, and thus the equivalent voltage and capacitance are 4 A volts and 2 B farads. The three capacitor devices 1 in FIG. 10B are connected in series, and thus the equivalent voltage and capacitance are 6 A volts and 2 B farads. The four capacitor devices 1 in FIG. 10C are connected in series, and thus the equivalent voltage and capacitance are 8 A volts and 2 B farads. It is obvious that the more the capacitor devices 1 are connected in series, the more significant the saving effect of utilizing the top surface and the bottom surface of the common electrode can be achieved.

Figure 11A:
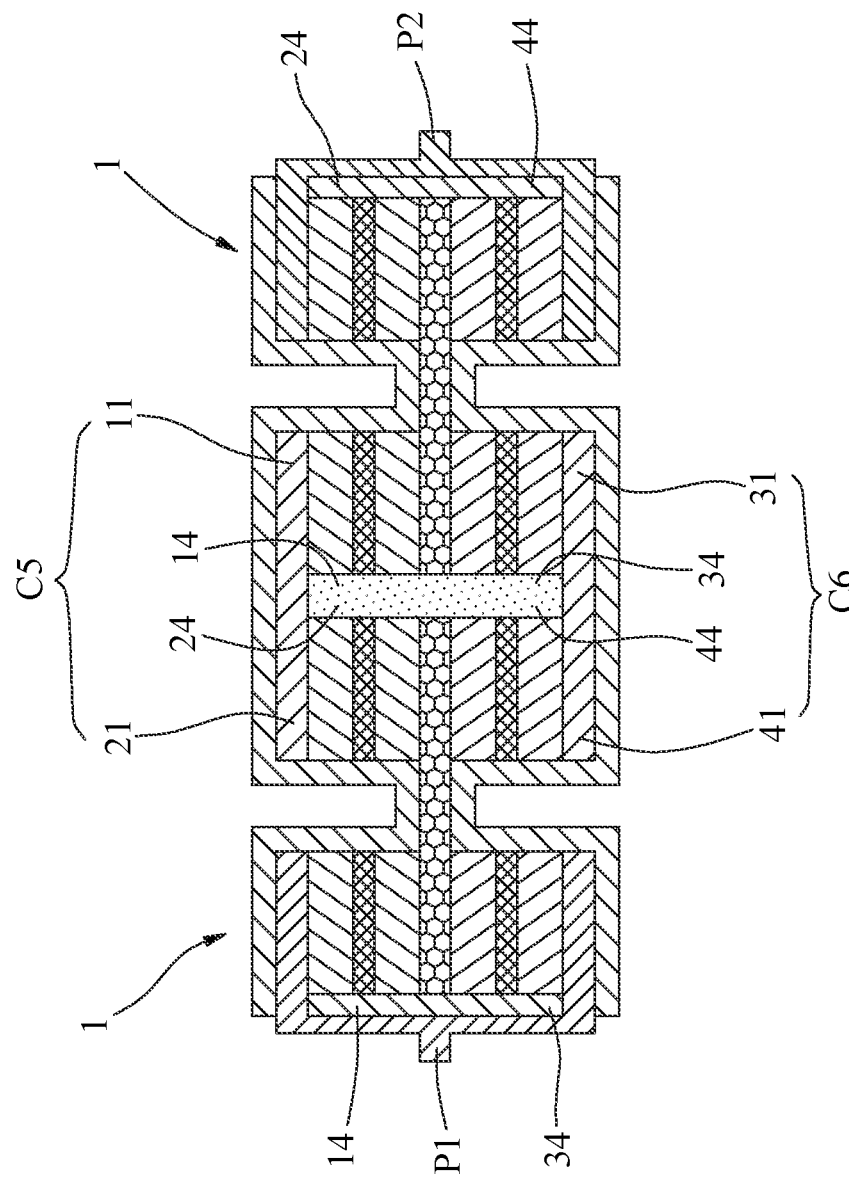
FIG. 11A is a schematic diagram showing another one structure of two serially connected capacitor devices of an energy storage system according to a second embodiment of the present disclosure.
Figure 11B:
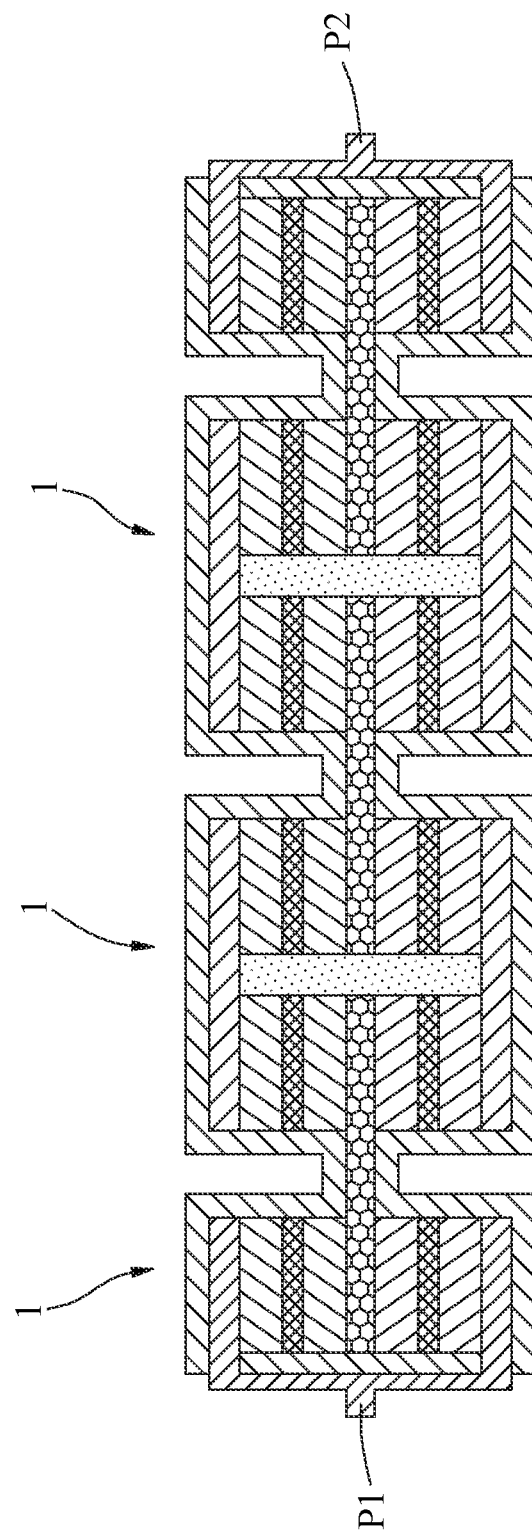
FIG. 11B is a schematic diagram showing another one structure of three serially connected capacitor devices of an energy storage system according to a second embodiment of the present disclosure.
Figure 11C:
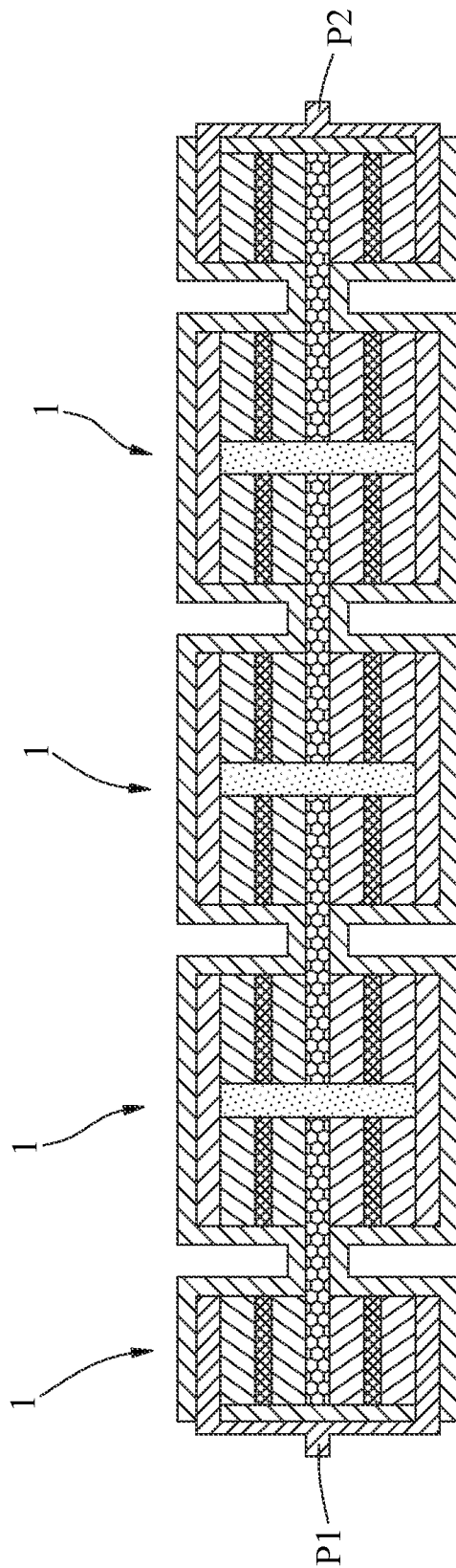
FIG. 11C is a schematic diagram showing another one structure of four serially connected capacitor devices of an energy storage system according to a second embodiment of the present disclosure.

Refer to FIG. 11A through 11C, the capacitor devices 1 in the second embodiment are connected in series, i.e. the capacitor devices 1 are arranged linearly and connected in series. The third electrode 21 and the seventh electrode 41 of the capacitor device 1, and the first electrode 11 and the fifth electrode 31 of another adjacent capacitor device 1 are formed integrally. In other words, the third electrode 21 and the seventh electrode 41 of the capacitor device 1, and the first electrode 11 and the fifth electrode 31 of other adjacent capacitor device 1 are formed by the same electrode plate which is the common electrode C5 of the two adjacent capacitor devices 1 (as shown in FIG. 11A). The seventh electrode 41 of the capacitor device 1 and the fifth electrode 31 of the other adjacent capacitor device 1 are formed by the same electrode plate which is the common electrode C6 of the two adjacent capacitor devices 1 (as shown in FIG. 11A). Thus, the capacitor devices 1 are connected in series, which can achieve the preset voltage and the preset capacitance. The two capacitor devices 1 in FIG. 11A are connected in series, and thus the equivalent voltage and capacitance are 4 A volts and 2 B farads. The three capacitor devices 1 in FIG. 11B are connected in series, and thus the equivalent voltage and capacitance are 6 A volts and 2 B farads. The four capacitor devices 1 in FIG. 11C are connected in series, and thus the equivalent voltage and capacitance are 8 A volts and 2 B farads. Similarly, the more the capacitor devices 1 are connected in series, the more significant the saving effect of utilizing the top surface and the bottom surface of the common electrode can be achieved.

According to the descriptions of the above embodiments, compared to the prior art and the conventional product, the battery device composed of the at least one secondary battery and the capacitor device composed of the at least one capacitor in the energy storage system of the present disclosure are connected in parallel, the DC/DC converter is combined with the battery device and the capacitor device, the resistance of the equivalent series resistor is configured to be larger than that of the internal resistor, and/or the resistance of the equivalent series resistor is configured to be not less than the lower resistance limit which is calculated according to the upper current limit of the rated current range of the DC/DC converter, such that the battery cycle life of the secondary battery is increased.

In summary, the energy storage system of the present invention can indeed achieve the expected effect through the embodiments disclosed above, and the energy storage system has not been disclosed before the present disclosure is filed. The present disclosure has been fully complied with the requirements and regulations of the patent law, thus the present disclosure is filed accordance with the patent law, and allowance of claims of the present disclosure is respectfully requested.

The above-mentioned descriptions represent merely the exemplary embodiment of the present disclosure, without any intention to limit the scope of the present disclosure thereto. Various equivalent changes, alternations or modifications based on the claims of present disclosure are all consequently viewed as being embraced by the scope of the present disclosure.

The invention claimed is:

1. An energy storage system, at least comprising:
a battery device, having an internal resistor;
a first terminal and a second terminal, wherein the first terminal and the second terminal are respectively connected to two electrodes of a battery device, and polarities of the two electrodes of the battery device are opposite to each other;
a capacitor device, electrically connected to the first terminal and the second terminal in parallel, and the capacitor device has an equivalent series resistor; and
a DC/DC converter, electrically connected between the first terminal and the capacitor device;
wherein a resistance of the equivalent series resistor is larger than that of the internal resistor;
wherein the energy storage system further comprises a third terminal, and the third terminal is electrically connected between the DC/DC converter and the capacitor device;
wherein the capacitor device at least comprises:
a first capacitor, having a first electrode, a second electrode, a first electrolyte layer and a first encapsulation body, wherein the second electrode is disposed opposite to the first electrode, the first electrolyte layer is disposed between the first electrode and the second electrode, and the first encapsulation body encapsulates the first electrode, the second electrode and the first electrolyte layer;
a second capacitor, having a third electrode, a fourth electrode, a second electrolyte layer and a second encapsulation body, wherein the fourth electrode is disposed opposite to the third electrode, the second electrolyte layer is disposed between the third electrode and the fourth electrode, and the second encapsulation body encapsulates the third electrode, the fourth electrode and the second electrolyte layer;
a third capacitor, having a fifth electrode, a sixth electrode, a third electrolyte layer and a third encapsulation body, wherein the sixth electrode is disposed opposite to the fifth electrode, the third electrolyte layer is disposed between the fifth electrode and the sixth electrode, and the third encapsulation body encapsulates the fifth electrode, the sixth electrode and the third electrolyte layer; and
a fourth capacitor, having a seventh electrode, an eighth electrode, a fourth electrolyte layer and a fourth encapsulation body, wherein the eighth electrode is disposed opposite to the seventh electrode, the fourth electrolyte layer is disposed between the seventh electrode and the eighth electrode, and the fourth encapsulation body encapsulates the seventh electrode, the eighth electrode and the fourth electrolyte layer;
wherein the first electrode and the third electrode are integrally formed, the fifth electrode and the seventh electrode are integrally formed, the second electrode and the sixth electrode are integrally formed, and the fourth electrode and the eighth electrode are integrally formed; the second electrode and the fourth electrode are electrically insulated from each other; the capacitor device further has a first lead electrode and a second lead electrode, the first lead electrode and the second electrode are electrically connected to each other, the second lead electrode and the fourth electrode are electrically connected to each other; the first lead electrode and the second terminal are electrically connected to each other, and the second lead electrode and the third terminal are electrically connected to each other.

2. The energy storage system according to claim 1, wherein the third terminal is used to provide electricity from the capacitor device to a load.

3. The energy storage system according to claim 2, wherein the load is a load of a smart watch, smart glasses, phone, electronic lock, electric tooth brush, hand tool or electric car.

4. The energy storage system according to claim 1, wherein the third terminal is used to provide electricity from an external power to the battery device.

5. The energy storage system according to claim 1, wherein the second electrode and the sixth electrode are formed by a first electrode plate, and acted as a first common electrode of the first capacitor and the third capacitor, and a top surface and a bottom surface of the first common electrode respectively form the first capacitor and the third capacitor.

6. The energy storage system according to claim 5, wherein the fourth electrode and the eighth electrode are formed by a second electrode plate, and acted as a second common electrode of the second capacitor and the fourth capacitor, and a top surface and a bottom surface of the second common electrode respectively form the second capacitor and the fourth capacitor.

7. The energy storage system according to claim 1, wherein the battery device is a secondary battery or formed by connecting secondary batteries in parallel or in series.

8. The energy storage system according to claim 1, wherein the capacitor device is a capacitor or formed by connecting capacitors in parallel or in series.

9. The energy storage system according to claim 1, wherein the DC/DC converter has a rated current range, the rated current range has an upper current limit and a lower current limit, the equivalent series resistor of the capacitor device has a lower resistance limit, the lower resistance limit is calculated and obtained according to the upper current limit, and the resistance of the equivalent series resistor is not less than the lower resistance limit.

10. The energy storage system according to claim 9, wherein the lower resistance limit is calculated by using equation (1):

$$V = I\left(\frac{\Delta t}{C} + R\right); \qquad \text{equation (1)}$$

wherein V is a rated voltage of the capacitor device, I is the upper current limit of the DC/DC converter, C is a capacitance of the capacitor device, $\Delta t$ is a charging/discharging time of the capacitor device, R is the lower resistance limit of the equivalent series resistor of the capacitor device.

* * * * *